(12) United States Patent
Saladi et al.

(10) Patent No.: US 11,537,475 B1
(45) Date of Patent: Dec. 27, 2022

(54) DATA GUARDIANSHIP IN A CLOUD-BASED DATA STORAGE SYSTEM

(71) Applicant: Druva, Sunnyvale, CA (US)

(72) Inventors: Naresh Saladi, Milpitas, CA (US); Abhijit Dinkar, San Jose, CA (US); Murali Bashyam, Fremont, CA (US)

(73) Assignee: DRUVA INC., Sunnyvale, CA (US)

( * ) Notice: Subject to any disclaimer, the term of this patent is extended or adjusted under 35 U.S.C. 154(b) by 416 days.

(21) Appl. No.: 16/568,083

(22) Filed: Sep. 11, 2019

Related U.S. Application Data

(60) Provisional application No. 62/729,549, filed on Sep. 11, 2018.

(51) Int. Cl.
*G06F 16/18* (2019.01)
*G06F 11/14* (2006.01)
*G06F 16/182* (2019.01)
*G06F 3/06* (2006.01)
*G06F 16/17* (2019.01)

(52) U.S. Cl.
CPC .......... *G06F 11/1448* (2013.01); *G06F 3/065* (2013.01); *G06F 3/067* (2013.01); *G06F 3/0619* (2013.01); *G06F 16/1734* (2019.01); *G06F 16/1844* (2019.01)

(58) Field of Classification Search
CPC ............. G06F 11/1448; G06F 16/1844; G06F 16/1734; G06F 3/0619; G06F 3/065; G06F 3/067
See application file for complete search history.

(56) References Cited

U.S. PATENT DOCUMENTS

| | | | | |
|---|---|---|---|---|
| 8,996,467 B2 * | 3/2015 | Apte | .................. | G06F 11/1456 707/741 |
| 10,254,996 B1 * | 4/2019 | Jain | ........................ | G06F 16/214 |
| 10,917,260 B1 * | 2/2021 | Bashyam | .............. | G06F 16/183 |
| 2013/0097380 A1 * | 4/2013 | Colgrove | .............. | G06F 3/0641 711/118 |
| 2014/0280061 A1 * | 9/2014 | Elkhou | ................... | G06F 16/93 707/722 |
| 2015/0178243 A1 * | 6/2015 | Lowery | ............... | G06F 12/0653 709/212 |
| 2015/0256617 A1 * | 9/2015 | Klose | .................... | G06F 16/972 709/217 |

(Continued)

OTHER PUBLICATIONS

Quick, D. (n.d.). "Forensic Analysis of Cloud Storage Client Data," Thesis submitted to the University of South Australia, Oct. 2012, 217 pages.

(Continued)

*Primary Examiner* — Alford W Kindred
*Assistant Examiner* — Tiffany Thuy Bui
(74) *Attorney, Agent, or Firm* — Kwan & Olynick LLP (57) ABSTRACT

Techniques and mechanisms described herein provide for verification of data across cloud-based and on-premises data storage systems. According to various embodiments, a backup client implemented on a first compute node can store a data file in a backup data repository. A data guardianship can store first data file state information describing the data file in a key-value store accessible via the internet. A data verification instance can analyze the backup data repository to verify that the data file is stored intact in the backup data repository.

15 Claims, 6 Drawing Sheets

(56) References Cited

U.S. PATENT DOCUMENTS

2016/0004466 A1* 1/2016 Lakshman ............ G06F 3/0661
                                                              711/114
2017/0308420 A1* 10/2017 Korotaev ............ G06F 11/0763
2019/0370116 A1* 12/2019 Jacob .................. G06F 16/1834

OTHER PUBLICATIONS

Security Guidance for Critical Areas of Focus in Cloud Computing V2.1. (n.d.). [online] Available at: https://cloudsecurityalliance.org/wp-content/uploads/2011/07/csaguide.v2.1.pdf [Accessed Feb. 6, 2020], 76 pages.

* cited by examiner

DATA GUARDIANSHIP IN A CLOUD-BASED DATA STORAGE SYSTEM

PRIORITY DATA

This patent document claims priority to U.S. Provisional Patent Application No. 62/729,549, titled "Data Guardianship in a Cloud-Based Data Storage System," by Saladi et al., filed on Sep. 11, 2018, which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

The present invention generally relates to data management across various public cloud storage providers, and more particularly relates to a method and a system for managing vast amounts of data across public cloud storage providers by implementing a data guardianship for cloud-based data storage.

BACKGROUND

Because cloud storage is distributed, the aggregate throughput is high, but individual object performance is low. There is a lack of standardized storage access and management functionality in the area of cloud storage. Consequently, developers usually customize their application to use proprietary application programming interfaces (APIs) provided by cloud storage vendors. Accordingly, improved techniques for interacting with cloud storage systems are desired.

BRIEF DESCRIPTIONS OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Reference will now be made in detail to some specific examples of the invention including the best modes contemplated for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of specific configurations of client machines and cloud storage providers. However, it should be noted that the techniques of the present invention apply to a wide variety of such configurations. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Example Embodiments

Data guardianship refers to actions performed to verify the integrity and security of data. Many organizations guard the primary backup copy of important data, for instance for compliance reasons. The aspect of guardianship is even more important when data doesn't reside in an organization's own data centers or on the organization's physical premises.

According to various embodiments, one aspect of data guardianship is access logging. A record or log is maintained that describes all operations performed on data after it has left an organization's on-premise data center. Another aspect of data guardianship is verification, which includes the periodic verification of the integrity of archived data.

The recovery time objective (RTO) for a data backup solution is the targeted duration of time and/or a service level within which the data may be restored, for instance to avoid unacceptable consequences associated with a break in business continuity. Providing guardianship without reducing RTO for large volumes of data is a challenging task.

Another important consideration in backup storage solutions is ingestion/backup performance time, which refers to the time taken to copy data from the source to the backup target. Providing guardianship without negatively affecting ingestion/backup performance time for large volumes of data is also a challenging task. For example, periodic verification of data may consume network bandwidth and/or backup target input/output cycles and thus impact backup and/or restore tasks.

Another important consideration in backup storage solutions is log access. Within an organization, multiple backup servers or gateways may backup data to potentially many different backup targets. Accordingly, a user may desire a consolidated or aggregated view of the access and/or verification logs across the system.

Conventional approaches that attempt to address data guardianship compliance features involve tape media, physical transfer of data to offsite location, and manual access logging/verification processes such as Iron Mountain. However, such conventional approaches involve high costs, manual processes and high recovery times (RTO). Also, accessing data under such conventional approaches typically requires first identifying which tape or tapes the data resides on. Then the identity of the tape or tapes is communicated to the service, which must find, pull, and ship the tape or tapes back to the organization. After the tapes are received, the tapes have to be mounted and the organization has to wait for the tapes to be searched to find the required data.

Conventional approaches that provide audit log support for NFS/SMB operations such as NetApp FAS and NearStore appliances store audit logs in flat append-only files on the appliance itself. Such approaches to logging limit ingest/readback performance. Further, there is no backup copy of this audit log in case of a disaster. In addition, it is difficult to query a flat file structure, so users typically must dump all audit log records in order to location information. Finally, when there are multiple such appliances, there is no easy way to aggregate and present audit log information across appliances.

Conventional approaches that involve third party compliance software that runs on top of existing storage appliances typically rely on a notification framework such as FPolicy on NetApp from an underlying storage server to get information about protocol requests such as NFS/SMB operations. Such notification frameworks are limited in performance as information flows back-and-forth between the storage server and the framework.

According to various embodiments, techniques and mechanisms described herein provide compliance features for data backed up over Network File System (NFS), Server Message Block (SMB), and Simple Storage Service (S3) protocols as well as virtual tape library (VTL).

According to various embodiments, techniques and mechanisms described herein provide for the automatic replication of access and verification logs by the cloud provider based on cloud account settings.

According to various embodiments, techniques and mechanisms described herein provide for multiple backup gateways storing audit log records in the same key-value store. Further, the system can present an aggregated/consolidated view of access and verification logs.

According to various embodiments, techniques and mechanisms described herein provide for a verification service that can be scaled up or down based on requirements and backup data volume.

According to various embodiments, techniques and mechanisms described herein provide for a verification service that does not incur additional cost for data read requests since the verification service may be run from within the same cloud computing environment in which the data is stored.

According to various embodiments, techniques and mechanisms described herein provide for a verification service in which verification service runs do not impact data ingestion or readback performance.

According to various embodiments, techniques and mechanisms described herein provide for a scalable verification service in which a distributed messaging framework such as Kafka can be used to prevent a key-value store bottleneck.

According to various embodiments, techniques and mechanisms described herein provide for proactive notification of users for certain access log or verification records.

In particular embodiments, techniques and mechanisms described herein provide for inserting records into key-value stores during backup or ingestion without impacting the backup performance or RPO. In addition, updates are performed within the actual operation transaction associated with the file, directory, tape, and/or object data request so that failure in appending the audit log results in rolling back the original transaction.

In particular embodiments, techniques and mechanisms described herein involve a verification service run as a micro service without any additional persistent state. Accordingly, transactions are not associated with a scope. Further, restartability is achieved through persistent checkpoints recorded in cloud object and/or table storage.

In particular embodiments, techniques and mechanisms described herein may be used to facilitate cloud storage as a replacement for conventional backup services such as virtual tape library via Iron Mountain. Further, organizations currently using tape workflows for compliance reasons can move to technologies such as an NFS/SMB backup model and achieve better recovery point objective (RPO) and RTO guarantees. RPO describes the interval of time that might pass during a disruption before the quantity of data lost during that period exceeds the organization's maximum allowable threshold or "tolerance." Similarly, techniques and mechanisms described herein may be used to replace conventional third-party compliance software and existing storage server solutions.

Enterprise data backup/archive applications typically interface with storage devices using standard storage protocols such as Network File System (NFS), Common Internet File System (CIFS), Internet Small Computer Systems Interface (iSCSI) Tape, Fiber Channel Tape, and Network Data Management Protocol (NDMP). These interfaces are generally presented by high performance, low latency storage systems. A storage administrator is also accustomed to a variety of storage management features such as centralized management of all storage assets, usage tracking, seamless data movement across storage tiers, snapshot and cloning of storage objects such as files, directories, volumes, and tapes.

Cloud storage, on the other hand, is high latency. Because cloud storage is distributed, aggregate throughput is high, but individual object performance is low. Further, cloud storage does not support standard storage protocols mentioned above. There is a lack of standardized storage access and management functionality in the area of cloud storage. Consequently, each user of cloud storage has to heavily customize their application to use proprietary application programming interfaces (APIs) provided by cloud storage vendor such as Amazon Web Service (AWS), Microsoft Azure, Google Cloud and several others. Further, conventional cloud-based techniques do not offer the data guardianship desired for secure and verified data backup. Accordingly, improved techniques for interacting with cloud storage systems are desired.

In many companies, client machines are configured to store information such as backup data to a network-attached storage system, with which the client machines communicate via a standard data storage protocol. Because cloud storage providers generally do not support such protocols, this has resulted in creating of a gap in what storage Enterprise backup/archive applications support and how cloud storage presents itself to end user and applications. Moreover, cloud storage management is lacking in terms of pan-cloud storage management functionality that a storage administrator is accustomed to.

According to various embodiments described herein, the network-attached storage system may be replaced with a virtual machine configured to facilitate communication between a client machine and a cloud storage provider. From the perspective of the client machine, the virtual machine appears identical or nearly identical to the network-attached storage system. However, the virtual machine does not store the data locally but instead acts as an interface for storing the data on the appropriate cloud storage system.

According to various embodiments, techniques and mechanisms described herein virtualize cloud storage from multiple vendors and presents standards-based access and management interface to cloud storage. Further, techniques and mechanisms described herein may be used to simplify usage of cloud storage by Enterprise Information Technology (IT) applications without any change to the application itself.

According to various embodiments, techniques and mechanisms described herein provide for improved efficiency and speed and reduced costs when ingesting and accessing files in a cloud storage environment. Furthermore, techniques and mechanisms described herein provide for improved security against unauthorized data access. Accordingly, such techniques provide for substantially improved performance of storage solutions in which data is stored in the cloud.

According to various embodiments, techniques and mechanisms described herein may be used to provide improved performance for a variety of applications. Such applications may include, but are not limited to: storage target for backup applications, direct backup and restore of data, and long term archival of data in the cloud.

Figure 1:
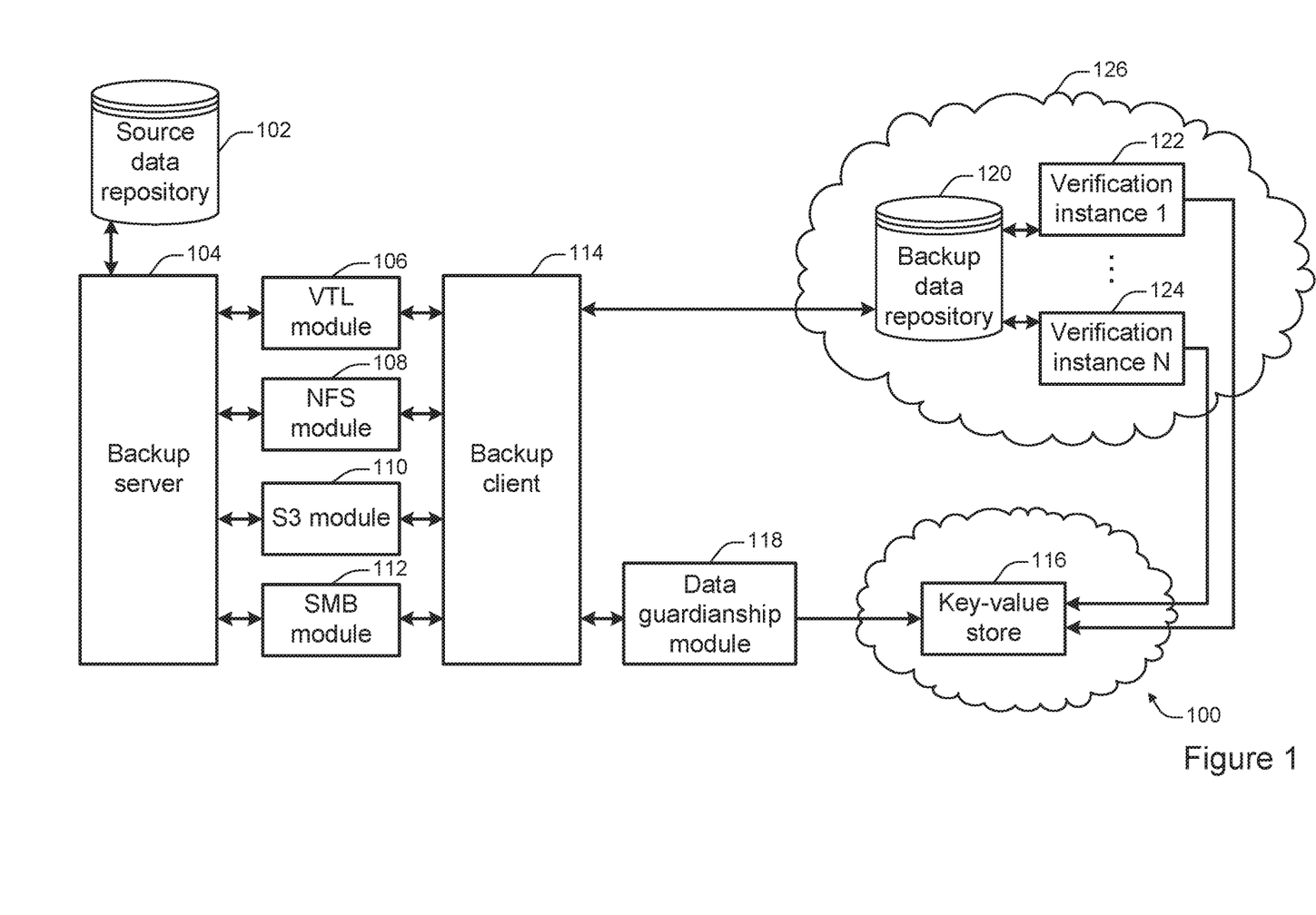
FIG. 1 illustrates an example of a system 100 for verifying data across cloud-based and on-premises storage systems, configured in accordance with one or more embodiments.

FIG. 1 illustrates an example of a backup system 100, configured in accordance to one or more embodiments. The backup system 100 may be used to back up, guard, and restore data from a source data repository.

According to various embodiments, the source data repository 102 may include one or more source data locations to be backed up. For example, the source data repository 102 may include one or more physical or virtual storage disks associated with an organization.

The source data repository 102 may be backed up via a backup server 104. In some embodiments, the backup server 104 may be located at the client organization premises. Alternately, the backup server 104 may be located remotely from the client, for instance on a compute node in a cloud computing system.

According to various embodiments, the source data repository 102 and the backup server 104 may communicate to periodically back up the data stored in the source data repository 102. The backup server 104 may be responsible for reading the appropriate data from the source data repository and storing that data to a suitable storage location. The backup server 104 may also be responsible for acting upon a request to restore data from the storage location to the source data repository.

According to various embodiments, the data may be stored in a backup data repository 120. The backup data repository 120 may be any suitable location or locations for storing data in the cloud. For example, the backup data repository may include one or more Amazon S3 buckets, Google Storage buckets, or Microsoft Azure Storage buckets. The cloud computing environment 126 may include components from one or more of any suitable public or private cloud computing infrastructure.

In some embodiments, the backup client 114 may provide a POSIX-like interface to a cloud storage location. That is, the backup client 114 may be configured to communicate with the backup server 104 as if the backup client 114 were a storage location. The backup client 114 may then take appropriate steps to store data to a backup storage location in the cloud and to restore data from the backup storage location upon request.

In some implementations, the backup client 114 may include one or more modules for facilitating communication with the backup server if that via various protocols. A VTL module 106 may provide support for iSCSI VTL based backups and restores. An NFS module 108 may provide support for NFS export-based file IO. An S3 module 110 may provide an S3 interface for object-based access. An SMB module 112 may provide support for SMB share-based file IO.

Figure 4:
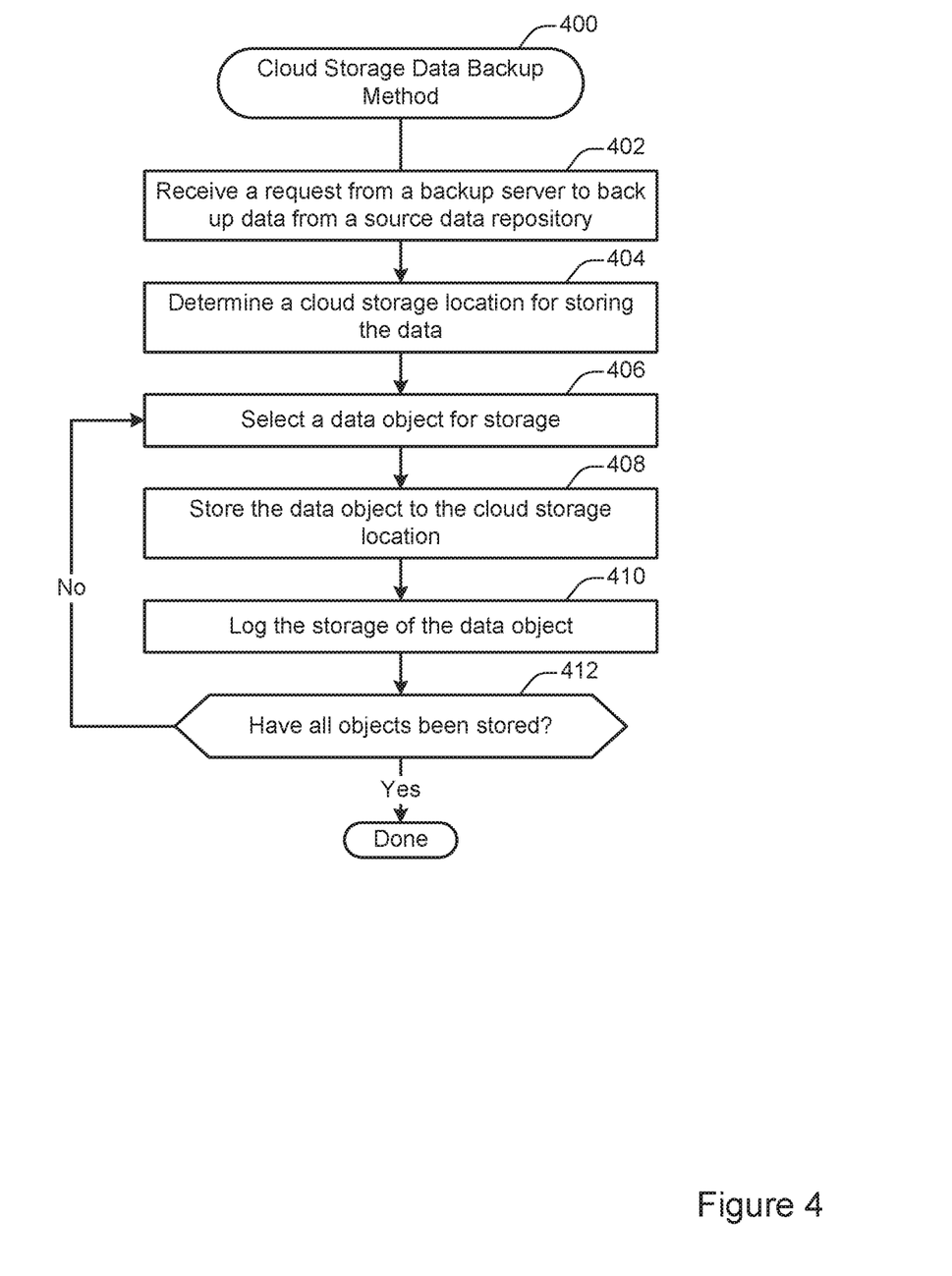
FIG. 4 shows an example of a method for data backup for cloud-based storage, configured in accordance with one or more embodiments.

Techniques for backing up data from the source data repository 102 to the backup data repository 120 are discussed in additional detail in FIG. 4. Techniques for restoring data from the backup data repository 122 to the source data repository 102 are discussed in additional detail in FIG. 5. In particular embodiments, the backup client 114 may be implemented on one or more compute nodes in a cloud computing environment.

The key-value store 116 is a data storage component configured to store, retrieve, and manage associative arrays. A key-value store may also be referred to as a key-value database, a dictionary, or a hash table. According to various embodiments, the key-value store 116 may be implemented using a key-value service provided within a cloud computing environment.

According to various embodiments, the data guardianship module 118 stores access logs for data ingested over VTL, NFS, SMB, and S3 protocols. For example, the access logs may be stored in a highly scalable, reliable, and replicated key-value store in the cloud.

In some embodiments, the backup client 114 may generate backup logs during the ingestion process. For example, in case of VTL, access log includes a record of all operations on tapes/cartridges. Such operations may include, but are not limited to: creation, exporting, importing, reusing, and erasing. As another example, in the case of NFS and SMB, all operations on files/directories are recorded for ingested data. Such operations may include, but are not limited to: mkdir, rmdir, create, unlink, rename, upload, archive, and restore.

As yet another example, in the case of S3, all operations on objects are recorded for ingested data. Such operations may include, but are not limited to: creation, deletion, uploading, and archiving.

According to various embodiments, access logs (i.e. audit logs) are recorded and/or updated during backup and data ingestion. Audit logs may be maintained for deleted files, directories, and objects as well as newly backed up files, directories, and objects.

In some embodiments, the key-value store 116 includes supports for partition and primary keys. In particular embodiments, no other indexes on other columns or properties within a key-value record are supported. Such a configuration may provide for faster writing and appending. The combination of partition and primary keys uniquely identifies each audit log record.

According to various embodiments, the partition key may be defined as the combination of the backup target storage location name and an identifier associated with the backed up object. For example, the identifier may be a tape barcode, a file name, or any other data object. Such a configuration distributes different backup objects on different nodes and may load balance read and write requests.

In some implementations, the primary key may be implemented as a timestamp of when the event has occurred. Cloud computing providers typically guarantee a certain number of replicas for a key-value store, for instance based on account settings. Accordingly, the key-value store 116 may exhibit redundancy in case of a disaster.

In particular embodiments, an audit log store may be implemented as an append-only store and may not allow any updates or deletions after records are inserted. In this way, the audit log store may maintain a complete picture of the changes to the data stored in the backup data repository 120.

According to various embodiments, the verification function may be provided as a micro service. Any suitable number of verification service instances can be created, such as the verification instances 122 through 124 shown in FIG. 1. Accordingly, the number of verification instances can be scaled up or down based on the amount of data to be verified. In particular embodiments, a verification service can be run within a Linux container in a containerized application system.

In some embodiments, each verification instance 122 may record the verification status for each analyzed file, directory, tape, or other object in the key-value store 116. Multiple verification runs may therefore create multiple verification records for each object. Further, because the verification service can run within the same cloud environment at which the data is stored, the verification records may be read without additional computing cost.

Figure 2:
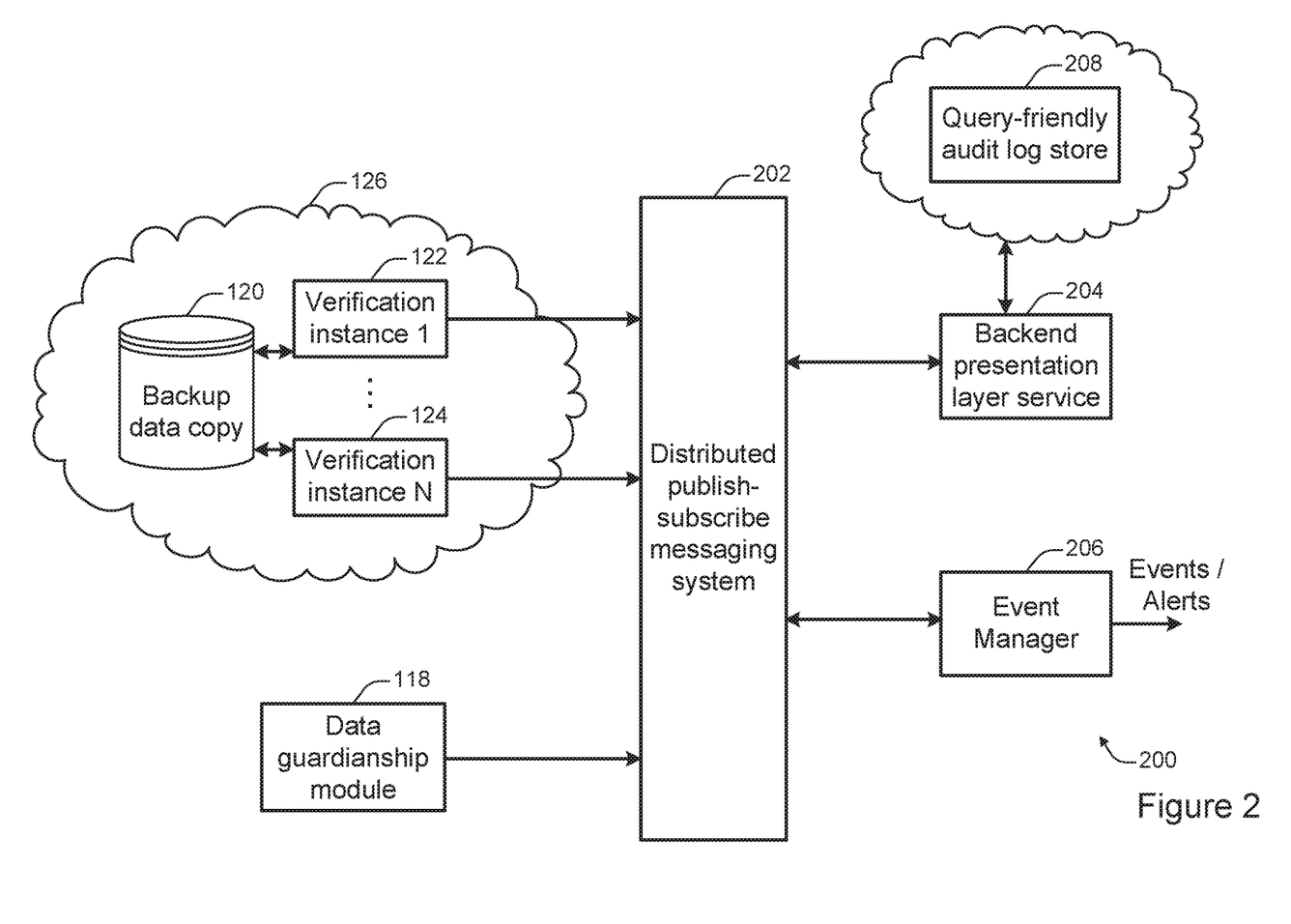
FIG. 2 illustrates an example of a system 200 for verifying data across cloud-based storage systems, configured in accordance with one or more embodiments.

FIG. 2 illustrates an example of a system configured to support query-friendly auditing. Simple queries like list of all operations on a particular object or all objects in time order can be answered from key-value store. Other complex queries, which require indexes on other properties or aggregations may be slow using key-value store. For this reason, additional services in the cloud can be used to read and transform data from key-value store into a format that enables creation of indexes on other properties and/or aggregators.

According to various embodiments, the configuration shown in FIG. 2 may facilitate filtering, querying, and aggregating audit log records. Alternately, or additionally, events and/or alerts may be generated based on user-subscribed actions on one or more objects.

At 202, a distributed publish-subscribe messaging system is shown. A publish-subscribe is a messaging pattern where senders of messages, called publishers, do not program the messages to be sent directly to specific receivers, called subscribers, but instead categorize published messages into classes, queues, or topics without knowledge of which subscribers, if any, there may be. Similarly, subscribers express interest in one or more classes and only receive messages that are of interest, without knowledge of which publishers, if any, there are. An example of a distributed publish-subscribe messaging system is Kafka.

According to various embodiments, the distributed publish-subscribe messaging system 202 may receive verification status entries from the verification instances. The distributed publish-subscribe messaging system 202 may then classify the verification status entries. Those entries meeting criteria established by a backend presentation layer service 204 or an event manager 206 may be transmitted to those entities for further storage or processing.

A backend presentation layer service is shown at 204. In some embodiments, the backend presentation layer service may subscribe to one or more queues to process records and transform audit log records for storage in the query-friendly audit log store 208.

An event manager is shown at 206. According to various embodiments, the event manager 206 can subscribe to certain queues and send events or alerts based on a recipient's subscription or interests. For example, a user can be notified if a particular file is accessed or edited.

According to various embodiments, the query-friendly audit log store 208 may be implemented as a database such as SQL or MongoDB that supports efficient and timely querying of audit logs.

In particular embodiments, the system configuration shown in FIG. 2 may supplement the system configuration shown in FIG. 1. That is, the distributed publish-subscribe messaging system 202, backend presentation layer service 204, event manager 206, and query-friendly audit log store 208 may be employed in addition to the components shown in FIG. 1. Alternately, the system configuration shown in FIG. 2 may be used instead of the key-value store configuration shown in FIG. 1.

Figure 3:
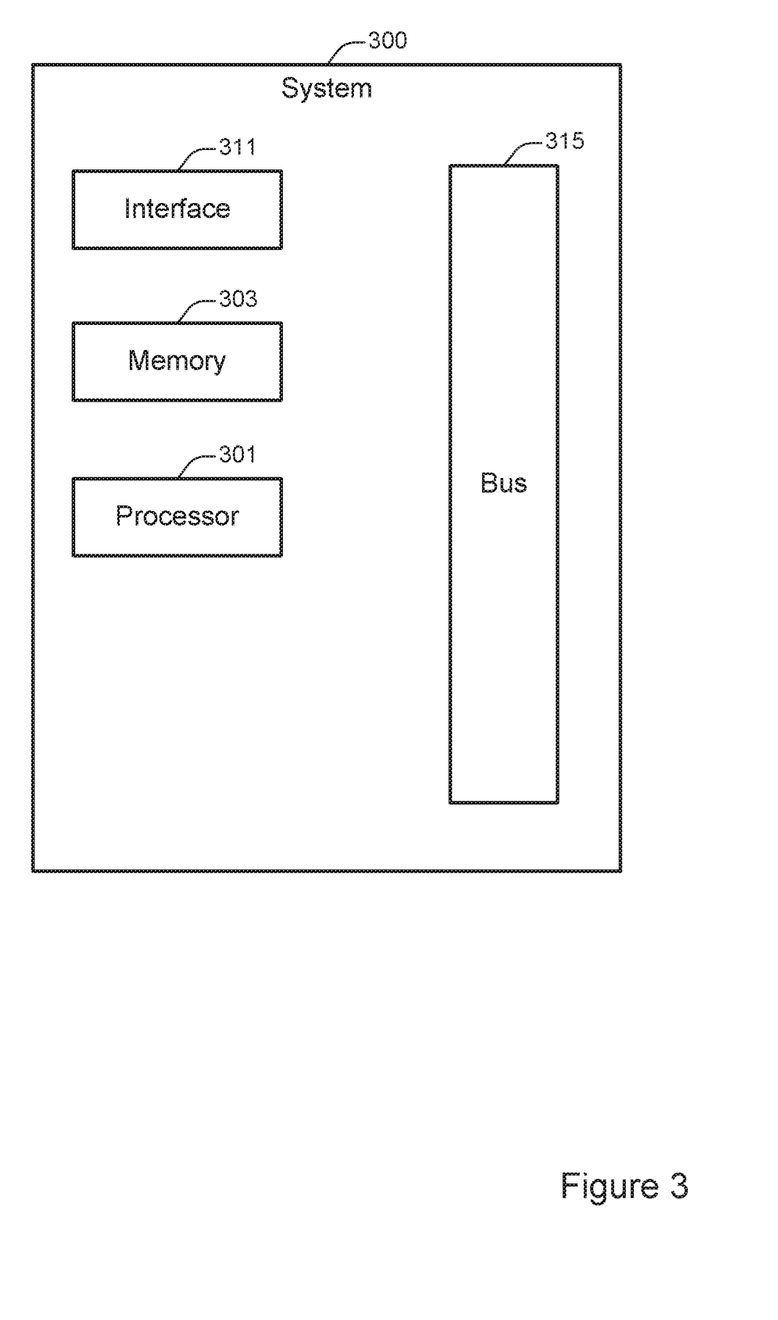
FIG. 3 illustrates an example of a server, configured in accordance with one or more embodiments.

FIG. 3 illustrates one example of a server. According to particular embodiments, a system 300 suitable for implementing particular embodiments of the present invention includes a processor 301, a memory 303, an interface 311, and a bus 319 (e.g., a PCI bus or other interconnection fabric). When acting under the control of appropriate software or firmware, the processor 301 is responsible for implementing applications such as a virtual machine, metadata system, or other such component of the system described herein. Various specially configured devices can also be used in place of a processor 301 or in addition to processor 301. The interface 311 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 300 is a virtual machine configured to communicate with one or more clients and one or more cloud storage systems. Although a particular server is described, it should be recognized that a variety of alternative configurations are possible. For example, the modules may be implemented on another device connected to the server.

According to various embodiments, one or more methods described herein may be implemented entirely or in part on the system 300. Alternately, or additionally, one or more methods described herein may be embodied entirely or in part as computer programming language instructions implemented on one or more non-transitory machine-readable media. Such media may include, but are not limited to: compact disks, spinning-platter hard drives, solid state drives, external disks, network attached storage systems, cloud storage systems, system memory, processor cache memory, or any other suitable non-transitory location or locations on which computer programming language instructions may be stored.

FIG. 4 illustrates a method 400 for backing up data. According to various embodiments, the method 400 may be performed at a backup client such as the backup client 114 shown in FIG. 1.

At 402, a request is received from a backup server to back up data from a source data repository. In some embodiments, the request may be generated periodically or at scheduled times.

A cloud storage location for storing the data is determined at 404. According to various embodiments, the storage location may be determined based on the request itself or upon configuration data associated with the organization.

At 406, a data object is selected for storage. In some implementations, objects may be stored in parallel or sequentially in any suitable order.

At 408, the data object is stored to the cloud storage location, and the storage of the data object is logged at 410. In some embodiments, the storage of the data object may be logged by communicating with the data guardianship module 118, which may store a record of the back up of the data object in the key-value store 116.

According to various embodiments, the storage of the data object may depend on the successful logging of the storage event. That is, if the creation of the log entry fails, the storage operation may be reversed so that all successful storage operations are logged.

At 412, a determination is made as to whether all data objects have been stored. If not, then an additional data object is selected for storage at operation 406.

Figure 5:
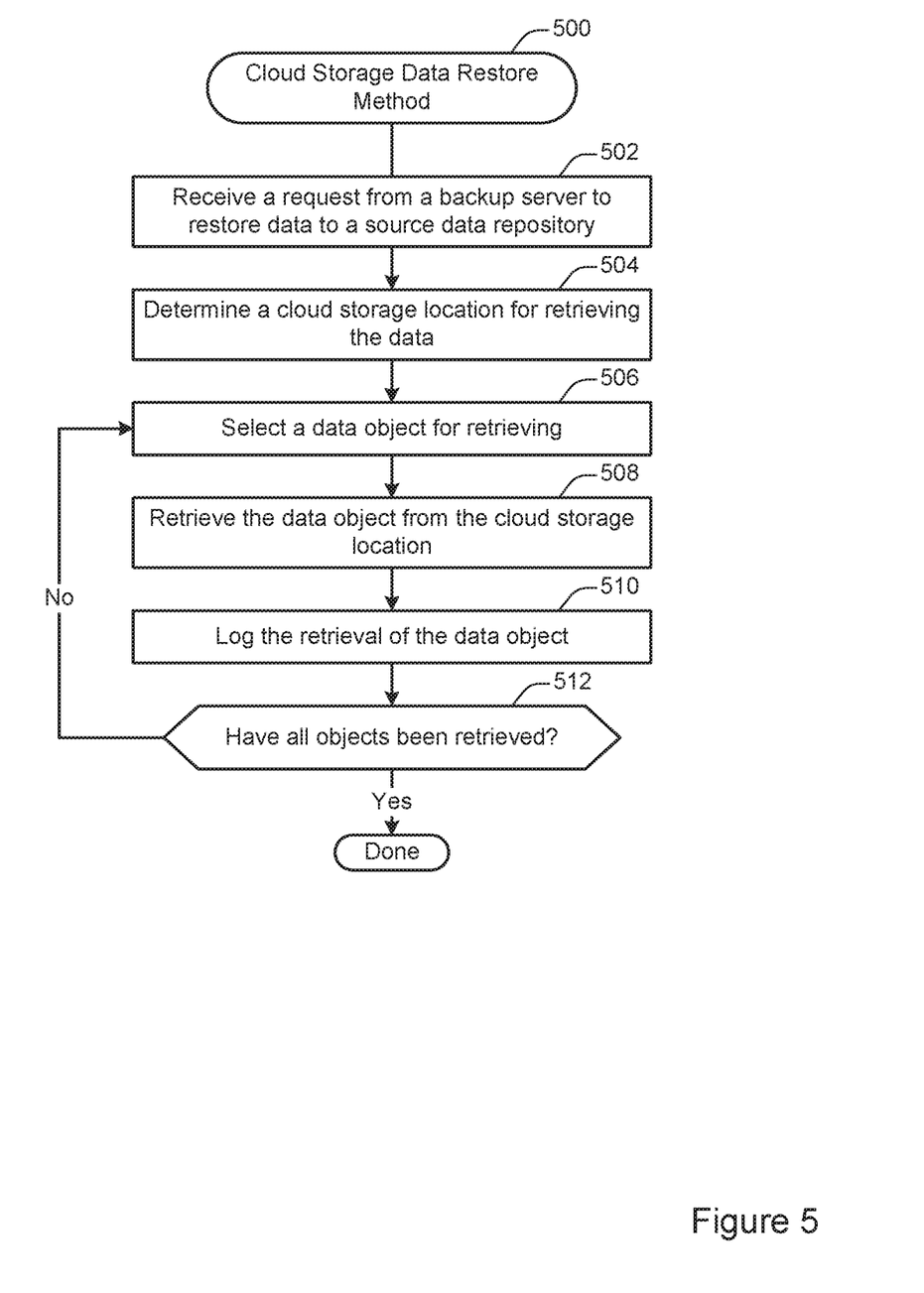
FIG. 5 shows an example of a method for restoring data for cloud-based storage, configured in accordance with one or more embodiments.

FIG. 5 illustrates a method 500 for restoring data. According to various embodiments, the method 500 may be performed at a backup client such as the backup client 115 shown in FIG. 1.

At 502, a request is received from a backup server to restore data to a source data repository. In some embodiments, the request may be generated when it is determined that the source data repository has become corrupted or compromised in some way.

A cloud storage location for retrieving the data is determined at 504. According to various embodiments, the storage location may be determined based on the request itself or upon configuration data associated with the organization.

At 506, a data object is selected for retrieval. In some implementations, objects may be retrieved in parallel or sequentially in any suitable order.

At 508, the data object is retrieved from the cloud storage location, and the retrieval of the data object is logged at 510. In some embodiments, the retrieval of the data object may be logged by communicating with the data guardianship module 118, which may store a record of the retrieval of the data object in the key-value store 116. The retrieved data object may then be transmitted to the source data repository by way of the backup server.

According to various embodiments, the retrieval of the data object may depend on the successful logging of the storage event. That is, if the creation of the log entry fails, the data object may not be transmitted to the source data repository.

At 512, a determination is made as to whether all data objects have been retrieved. If not, then an additional data object is selected for retrieval at operation 506.

Figure 6:
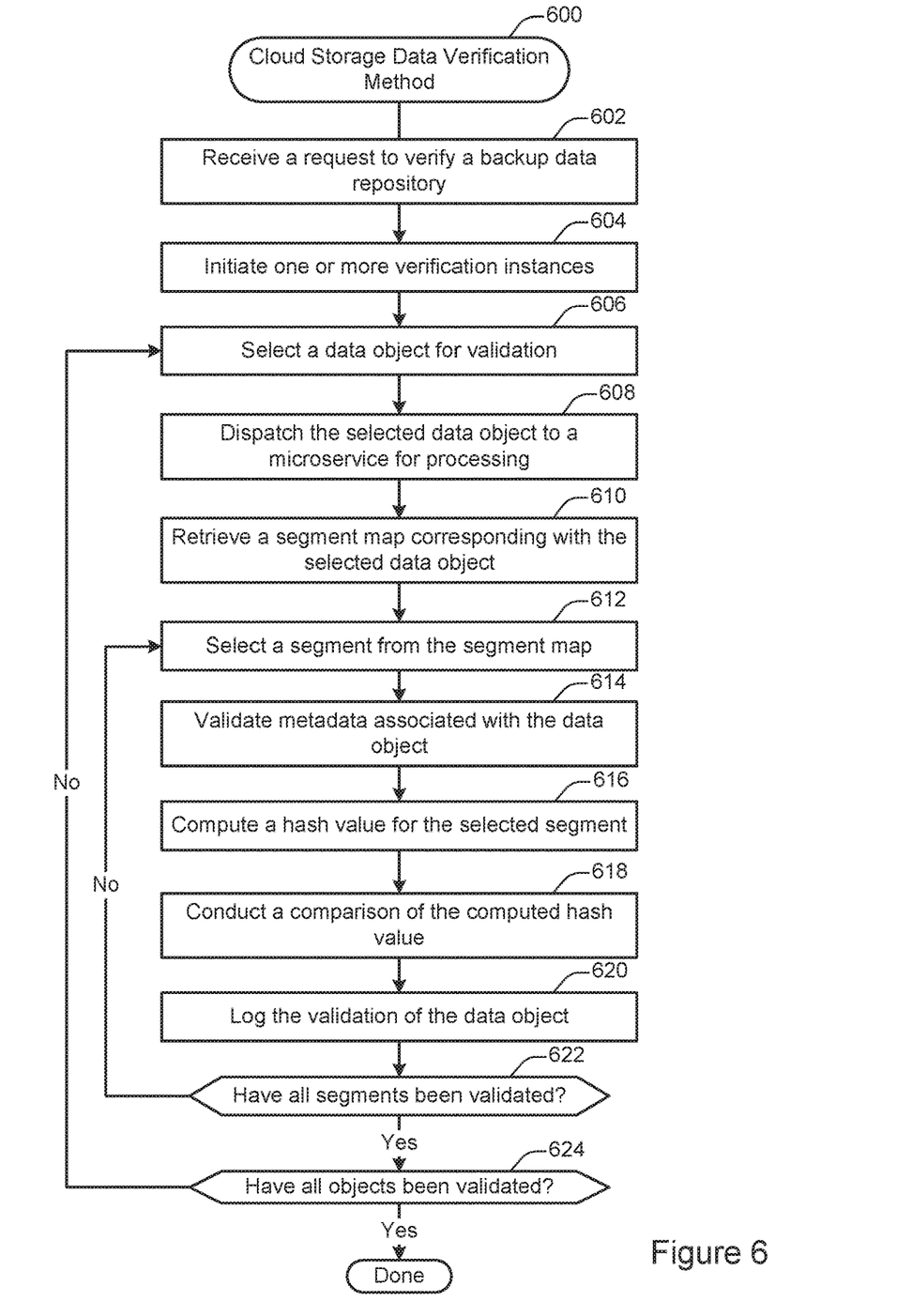
FIG. 6 shows an example of a method for data verification for cloud-based storage, configured in accordance with one or more embodiments.

FIG. 6 illustrates a method 600 for validating data. According to various embodiments, the method 600 may be performed at a backup client such as the backup client 116 shown in FIG. 1.

At 602, a request is received from a backup server to validate data stored in a backup data repository. In some embodiments, the request may be generated periodically or at scheduled times. Examples of scheduled requests can include an administrator may configure verification of a backup data store on hourly, daily, weekly, etc. Other examples of scheduled requests can include responses to system events. For example, an administrator can configure a rule such that each time a particular file is accessed, a request to validate a data store is triggered. While validation requests can be automatically generated, validation requests can also be generated in response to a manual request from an administrator. For example, an IT manager may request to validate the date stored in a backup data repository after receiving an email from a nervous marketing manager that believes the file for their latest commercial has been corrupted.

One or more verification instances are initiated at 604. According to various embodiments, the number of verification instances to initiate may be strategically determined based on factors such as the amount of data to verify and the desired speed for verifying the data.

At 606, a data object is selected for verification. In some implementations, objects may be verified in parallel or sequentially in any suitable order. For example, objects may be selected for verification by retrieving a list of entries from the key-value store 116 that correspond to the objects stored in the cloud storage location. The verification service at the top level may be implemented as a crawler that crawls the namespace vault and selects files from the namespace.

The selected data object is dispatched to a microservice for processing at operation 608. According to various embodiments, the microservice may be configured to perform one or more validation functions for the segment. For example, at operation 610 a segment map corresponding with the selected data object is retrieved.

According to various embodiments, the segment map may be stored in any suitable location. For example, segment maps may be stored in the backup data repository 120. As another example, segment maps may be stored in a segment map repository accessible to the microservice via a network.

At 612, a segment is selected from the segment map. In some implementations, segments may be selected from the segment map in parallel or sequentially in any suitable order.

Each segment map may list the segments that compose a particular data object. For example, segment ordering information may be included so that the segment map describes how to reconstruct the data object by combining the segments that compose it.

At 614, the metadata associated with the data object is validated. According to various embodiments, the validation of the metadata associated with the data object may involve one or more of various operations to evaluate whether the status of the data object as stored in the cloud storage location matches the information included in the key-value store. For example, the system may verify that the data object exists in the cloud storage location. As another example, the system may verify that the size of the data object matches that recorded in the key-value stored.

At 616, a hash value for the selected segment is calculated. According to various embodiments, any suitable hash function may be used so long as it is consistent with the hash function used when initially storing the data object to the storage volume. For example, a SHA-1 hash function may be employed. The hash value may be calculated by applying the hash function to the content of all or a portion of the data segment as stored on the storage volume.

At 618, a comparison of the computed hash value is performed. In some embodiments, the comparison may involve comparing the computed hash value to a hash value retrieved from the key-value store. For example, a hash value may be stored in the key-value store when the data object was initially ingested and stored in the storage volume.

In some embodiments, the comparison performed at operation 618 may involve comparing the computed hash value to a hash value stored along with the data object. For example, a hash value may be stored in the storage volume along with the data segment when the data object was initially ingested and stored in the storage volume.

In particular embodiments, the comparison performed at operation 618 may involve comparing a hash value stored along with the data object with a hash value retrieved from the key-value store.

According to various embodiments, by conducting one or more of these comparisons, the system may be able to determine that the data stored on the storage volume in association with the data segment is consistent with the data that was initially received for storage. Such a comparison may be useful for validating that the data has not become corrupted in some way.

The validation of the data object is logged at 620. In some embodiments, the validation of the data object may be logged by communicating with the key-value store 116 and/or the distributed publish-subscribe messaging system 202. The validation of the data object may be logged by storing information such as whether the metadata was validated at operation 614 and whether the comparison conducted at operation 618 determined that the hash values were identical.

At 622, a determination is made as to whether all segments included in the segment map have been validated. If not, then an additional segment is selected for validation at operation 612. If so, then a determination is made at 624 as to whether all data objects have been validated. If not, then an additional data object is selected for validation at operation 606.

According to various embodiments, the operations shown in FIG. 6 may be performed in an order different than that shown, and/or one or more operations may be omitted. For example, more than one file may be selected for processing in sequence or in parallel by the same microservice. As another example, metadata associated with a data object may be validated without computing and comparing hash values. As yet another example, hash values may be computed and compared without validating metadata.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A system comprising:
a backup client implemented on a first compute node that includes a first processor and a first memory module, the backup client configured to receive a data file from a backup server via a communications protocol and to store the data file in a backup data repository;
a data guardianship module implemented on a second compute node that includes a second processor and a second memory module, the data guardianship module configured to store first data file state information describing the data file in a key-value store; and
a data verification instance instantiated by the data guardianship module, the data verification instance configured to
in response to a request for verification of the data file, retrieve an entry from the key-value store that corresponds to the data file, the entry including the first data file state information, wherein the request for verification is associated with a request from the backup server via the communications protocol to access the data file stored in the backup data repository; and
analyze the backup data repository to determine second data file state information describing the data file that is stored in the backup data repository, the data verification instance further configured to compare the first state information with the second state information to verify that the data file is stored intact in the backup data repository;
in response to a verification that the data file is stored intact in the backup data repository, the backup client being further configured to:
retrieve the data file from the backup data repository;
provide access to the data file via the communication protocol, and
provide a status indication of the request to access the data file to the data guardianship module; and
update the key-value store with third data file state information in response to successfully verifying that the data file is stored intact in the backup data repository, the third data file state information representing a log entry of the successful verification of data file.

2. The system of claim 1, wherein the data guardianship module is further configured to:
update the key-value store with fourth data file state information in response to receiving the request to access the data file, the update representing a log entry of the request to access the data file.

3. The system of claim 1, wherein the data verification instance comprises a first data verification instance, and wherein the data guardianship module is further configured to:
  instantiate a second data verification instance different from the first data verification instance, the second data verification instance configured to compare fifth state information with fourth state information of a second data file, and wherein first data verification instance is further configured to analyze a first portion of the backup data repository and the second data verification instance further configured to analyze a second portion of the backup data repository different from the first portion.

4. The system of claim 1, wherein the data verification instance is further configured to compare the first state information with the second state information to verify by determining that the first state information is identical with the second state information.

5. The system of claim 1, wherein the communications protocol includes one or more of: a Network File System protocol, a Server Message Block protocol, a Simple Storage Service, or a virtual tape library protocol.

6. A method comprising:
  receiving, via a backup client implemented on a first compute node that includes a first processor and a first memory module, a data file from a backup server via a communications protocol, wherein the data file is to be stored in a backup data repository;
  storing, via a data guardianship module implemented on a second compute node that includes a second processor and a second memory module, first data file state information describing the data file in a key-value store;
  receiving a request for verification of the data file, wherein the request for verification is associated with a request from the backup server via the communications protocol to access the data file stored in the backup data repository;
  retrieving an entry from the key-value store that corresponds to the data file, the entry including the first data file state information;
  analyzing, via a data verification instance instantiated by the data guardianship module, the backup data repository to determine second data file state information describing the data file that is stored in the backup data repository, the data verification instance configured to compare the first state information with the second state information to verify that the data file is stored intact in the backup data repository;
  responsive to a verification that the data file is stored intact in the backup data repository:
    retrieving the data file from the backup data repository;
    providing access to the data file via the communication protocol, and
    providing a status indication of the request to access the data file to the data guardianship module; and
    updating the key-value store with third data file state information in response to successfully verifying that the data file is stored intact in the backup data repository, the third data file state information representing a log entry of the successful verification of data file.

7. The method of claim 6, the method further comprising:
  updating the key-value store with fourth data file state information in response to receiving the request to access the data file, the update representing a log entry of the request to access the data file.

8. The method of claim 6, wherein the data verification instance comprises a first data verification instance, the method further comprising:
  instantiating a second data verification instance different from the first data verification instance, the second data verification instance configured to compare fifth state information with fourth state information of a second data file, and wherein first data verification instance is further configured to analyze a first portion of the backup data repository and the second data verification instance further configured to analyze a second portion of the backup data repository different from the first portion.

9. The method of claim 6, wherein the data verification instance is further configured to compare the first state information with the second state information to verify by determining that the first state information is identical with the second state information.

10. The method of claim 6 wherein the communications protocol includes one or more of: a Network File System protocol, a Server Message Block protocol, a Simple Storage Service, or a virtual tape library protocol.

11. The method of claim 6, further comprising:
  storing the data file in the backup data repository if the first data file state information is successfully stored; and
  not storing the data file in the backup data repository if the first data file state information is not successfully stored.

12. A computer program product comprising one or more non-transitory computer readable media having instructions stored thereon for performing a method, the method comprising:
  receiving, via a backup client implemented on a first compute node that includes a first processor and a first memory module, a data file from a backup server via a communications protocol, wherein the data file is to be stored in a backup data repository;
  storing, via a data guardianship module implemented on a second compute node that includes a second processor and a second memory module, first data file state information describing the data file in a key-value store;
  receiving a request for verification of the data file wherein the request for verification is associated with a request from the backup server via the communications protocol to access the data file stored in the backup data repository; retrieving an entry from the key-value store that corresponds to the data file, the entry including the first data file state information;
  analyzing, via a data verification instance instantiated by the data guardianship module, the backup data repository to determine second data file state information describing the data file that is stored in the backup data repository, the data verification instance configured to compare the first state information with the second state information to verify that the data file is stored intact in the backup data repository;
  responsive to a verification that the data file is stored intact in the backup data repository:
    retrieving the data file from the backup data repository;
    providing access to the data file via the communication protocol, and
    providing a status indication of the request to access the data file to the data guardianship module; and updating the key-value store with third data file state information in response to successfully verifying that the data file is stored intact in the backup data repository, the third data file state information representing a log entry of the successful verification of data file.

13. The computer program product of claim 12, the method further comprising:
updating the key-value store with fourth data file state information in response to receiving the request to access the data file, the update representing a log entry of the request to access the data file.

14. The computer program product of claim 12, the data verification instance comprises a first data verification instance, and wherein the method further comprising:
instantiating a second data verification instance different from the first data verification instance, the second data verification instance configured to compare fifth state information with fourth state information of a second data file, and wherein first data verification instance is further configured to analyze a first portion of the backup data repository and the second data verification instance further configured to analyze a second portion of the backup data repository different from the first portion.

15. The computer program product of claim 12, wherein the data verification instance is further configured to compare the first state information with the second state information to verify by determining that the first state information is identical with the second state information.

* * * * *